June 23, 1959  L. D. MOELLER  2,891,514
POSITIVE STOP CYLINDER
Filed March 13, 1958

INVENTOR.
LAWRENCE D. MOELLER
BY Kimmel & Crowell
ATTORNEYS

United States Patent Office 2,891,514
Patented June 23, 1959

2,891,514

POSITIVE STOP CYLINDER

Lawrence D. Moeller, Portland, Oreg.

Application March 13, 1958, Serial No. 721,155

4 Claims. (Cl. 121—40)

The present invention relates to devices for controlling the movement of pistons within air or vacuum cylinders including a hydraulic cylinder operating in parallel thereto, the hydraulic cylinder having a shut off valve for stopping the flow of liquid therein between one side of the piston and the other side.

The primary object of the invention is to provide means for controlling movements of pistons within air or vacuum cylinders by controlling the flow between one side of the piston and the other of a hydraulic cylinder, the piston rods being positively connected, the releasing of the liquid flow is simultaneously controlled with the entrance of air into the air or vacuum cylinder so that the air or vacuum cylinder can operate.

Another object of this invention is to provide means controlling the flow of liquid within the liquid cylinder by either an air operated valve mechanism system, or by electro-magnetic operated mechanism.

Other objects and advantages will become apparent in the following specification when considered in the light of the attached drawings, in which.

Figure 1:
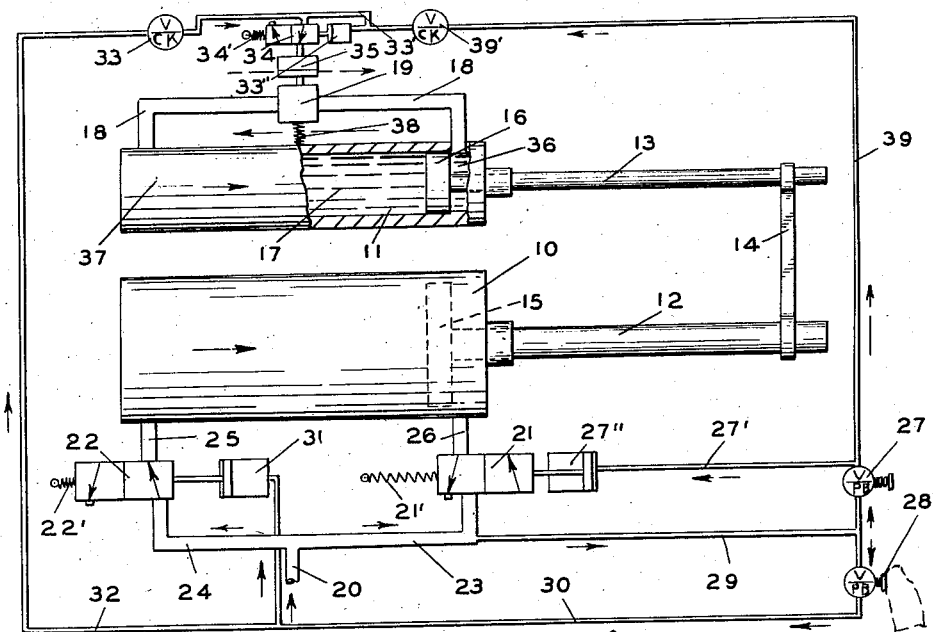
Figure 1 is a semi-diagrammatical layout of a pneumatic cylinder working in combination with a hydraulic cylinder, shown partially broken away and in section for convenience of illustration.

Referring now to the drawings in detail wherein like reference characters indicate like parts throughout the several figures, the reference numeral 10 indicates generally a pneumatic cylinder having arranged parallel thereto a hydraulic cylinder indicated at 11. Piston rod 12 of the cylinder 10 is connected to piston rod 13 of the hydraulic cylinder 11 by a cross-head 14 so as to cause the rods 12 and 13 to travel with each other. Piston 15 of the pneumatic cylinder 10 is indicated by dotted lines, while piston 16 of the hydraulic cylinder 11 is shown in full lines in Figure 1.

The liquid 17 within the hydraulic cylinder 11 is permitted to flow from one end of the cylinder 11 to the other end thereof through a manifold 18 and a shut off valve 19. Air is supplied to the system by a feed line 20. This air is delivered to a pair of master air control valves 21 and 22 by pipes 23 and 24, and delivered from the valves 21, 22 into the cylinder 10 through conduit lines 25 and 26.

A pair of hand operated push button control valves 27 and 28 receives air through a pipe 29 from the pipe 23.

In Figure 1, I illustrate the control valve 28 being operated. Operation of the valve 28 allows air to flow from the valve 28 through the pipe 30 into master valve operating cylinder 31, which moves the master valve 22 against the tension of the spring 22' to the position illustrated by the arrows. Air will flow from the main line 20 through the pipe 24, into the valve 22 and into the cylinder 10 through pipe line 25, forcing the piston 15 in the direction of the arrow. At the same time this happens air will flow through pipe line 32, through check valve 33, pipe line 33' into the cylinder 33", which will open the pilot valve 34 against the tension of spring 34'. Air will then flow into a cylinder 25, which opens the valve 19 against the tension of spring 38, permitting hydraulic liquid 17 to flow out of the end 36 of the cylinder 11 into the end 37, allowing the piston 16 to move with the piston 15 of the pneumatic cylinder 10. A check valve 39' prevents air from backing up into line 39.

The instant the operator removes his finger from the push button 28, air will cease to flow through the pilot valve 34, allowing the spring 38 to close the fluid valve 19. Air will then be exhausted from the cylinder 35 out through the pilot valve 34. When the valve 19 is closed by the spring 38, it will stop the flow of fluid through the manifold 18 from one end of the cylinder 11 to the other, therefore stopping the movement of the piston 16, which in turn will stop the movement of the piston 15 in the air cylinder 10. Simultaneously therewith air will be shut off from the cylinder 10 by closing the valve 28, allowing the spring 22' to close the master air supply valve to the cylinder 10.

In the event it is desired to move the piston rod 12 in the opposite direction, the push button control valve 27 is opened, which will again open the valve 19 under pressure of air received through pipe line 39, delivering air to the pilot valve 34 to cause air to enter the cylinder 35, again opening the valve 19, permitting the flow of liquid through the manifold 18. At the same time air will be delivered from the valve 27 through the pipe 27' into the valve operating cylinder 27" to open the master valve 21 supplying air from the line 23 through the valve 21, and pipe 26 into the cylinder 10, moving the piston 15 in the opposite direction of the arrow, until the operator releases the push button valve 27 to again cause the liquid valve 19 to close by action of the spring 38, and also again close the master valve 21 by action of the spring 21'.

Figure 2:
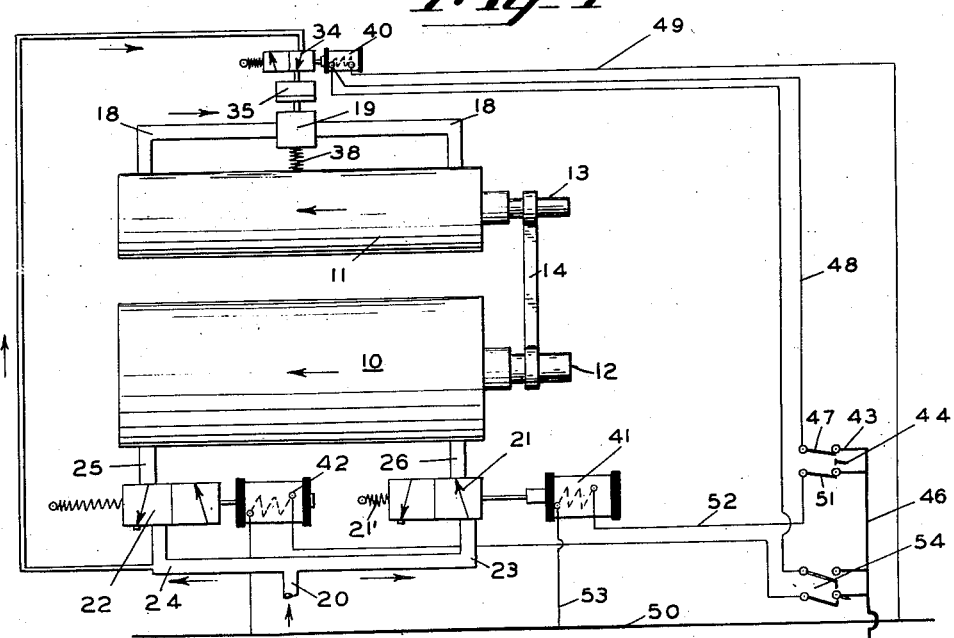
Figure 2 is a view similar to Figure 1, illustrating a modified form of the invention.

In Figure 2, a modified form of the invention is shown wherein the pilot valve 34 is operated by an electric solenoid 40, and the master valves 21 and 22 are operated by electric solenoids 41 and 42.

I will now describe the operation of the electro-magnetic system. A double-pole switch 43 shown in closed position is operated by push button 44. When the switch 43 is closed, electric energy will flow from the main line 45, through a conductor 46, through switch bar 47, conductor 48 into the solenoid 40 and back through line 49 to main line 50. The solenoid 40 will operate the pilot valve 34, admitting air into the cylinder 35 to open the liquid valve 19 and thus permit the piston 16 within the cylinder 11 to move.

At the same time electric energy will flow from the conductor 46, through the switch bar 51, conductor 52, solenoid 41, back to the main line 50 through conductor 53. This opens the master valve 21, permitting air to flow from the supply line 20, pipe 23, through the valve 21 and into the cylinder 10 through the pipe 26. When the switch 43 is opened, the movement of the pistons 15 and 16 within the cylinders 10 and 11 will be stopped by the closing of the valve 19 by action of spring 38 and the closing of the master valve 21, by action of the spring 21'. The operation of the push button switch 54 will cause the movement of the piston 15 in the opposite direction to the arrows, opening master valve 22 and also the liquid valve 19.

Having thus described the preferred embodiments of the invention, it should be understood that numerous structural modifications and adaptations may be resorted to without departing from the scope of the appended claims.

What is claimed is:

1. A control mechanism comprising a pneumatic cylinder, a piston supported for reciprocation in said cylinder, a connecting rod fixed to said piston and extending outwardly of said cylinder, air conduits extending to each end of said cylinder, a hydraulic cylinder positioned parallel to said pneumatic cylinder, a piston positioned in said hydraulic cylinder, a connecting rod fixed to the piston in said hydraulic cylinder and extending outwardly of said cylinder parallel to the connecting rod extending from said pneumatic cylinder, a crosshead securing said connecting rods together, a manifold conduit connected to opposite ends of said hydraulic cylinder, said hydraulic cylinder and said manifold being filled with hydraulic fluid, a shut off valve mounted in said manifold controlling the flow of hydraulic fluid from one end of said manifold to the other end of said manifold, means controlling said shut off valve, an air control valve positioned in the air conduit extending to each end of said pneumatic cylinder, means for individually actuating each of said air control valves, and hand controlled means for simultaneously opening a selected one of said air control valves and said shut off valve to permit movement of the piston in the hydraulic cylinder while simultaneously supplying air to move the piston in the pneumatic cylinder.

2. A device as claimed in claim 1 wherein the means for controlling said shut off valve includes a pneumatic piston controlled by an air supply valve and said air supply valve is controlled by said hand controlled means.

3. A device as claimed in claim 2 wherein each of said air control valves are pneumatically operated and said hand controlled means supplies air for the pneumatic operation of said air control valves.

4. A device as claimed in claim 2 wherein electromagnetic means control said air control valves and said hand control means includes a plurality of electric switches controlling electric current flow to said electromagnetic means.

References Cited in the file of this patent

UNITED STATES PATENTS 887,518     Raub _____ May 12, 1908